United States Patent
Huang et al.

(10) Patent No.: US 7,436,787 B2
(45) Date of Patent: Oct. 14, 2008

(54) TRANSCEIVER FOR FULL DUPLEX COMMUNICATION SYSTEMS

(75) Inventors: Chih-Wen Huang, Kao-Hsiung Hsien (TW); Mu-Jung Chen, Kao-Hsiung (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 727 days.

(21) Appl. No.: 10/904,453

(22) Filed: Nov. 11, 2004

(65) Prior Publication Data

US 2005/0185603 A1   Aug. 25, 2005

Related U.S. Application Data

(63) Continuation-in-part of application No. 10/904,338, filed on Nov. 4, 2004.

(30) Foreign Application Priority Data

Feb. 10, 2004   (TW) .............................. 93103106 A

(51) Int. Cl.
*H04B 3/20* (2006.01)
*H04M 9/08* (2006.01)

(52) U.S. Cl. .................. 370/286; 370/289; 379/406.01

(58) Field of Classification Search ......... 370/276–293; 379/406.01–406.16; 455/570
See application file for complete search history.

(56) References Cited

U.S. PATENT DOCUMENTS 5,528,687 A * 6/1996 Tanaka et al. .......... 379/406.12
5,694,474 A   12/1997 Ngo et al.
5,812,537 A   9/1998 Betts et al.
5,960,077 A   9/1999 Ishii et al.
6,278,785 B1 * 8/2001 Thomasson .................. 381/66
6,373,908 B2   4/2002 Chan
6,775,529 B1   8/2004 Roo
6,947,478 B1   9/2005 Hauptmann et al.
6,965,578 B1   11/2005 Kappes
6,980,644 B1   12/2005 Sallaway et al.
7,304,961 B2 * 12/2007 Huang et al. ................ 370/286
7,307,965 B2   12/2007 Huang
2002/0101983 A1   8/2002 Lee
2003/0169875 A1   9/2003 Lee
2003/0214903 A1   11/2003 Lee
2005/0084003 A1   4/2005 Duron

FOREIGN PATENT DOCUMENTS

TW    318989    11/1997
TW    507433    10/2002

OTHER PUBLICATIONS

"15MHz, BIMOS Operational Amplifier with MOSFET Input/CMOS Output", Harris Semiconductor, Sep. 1998, pp. 1, 4, CA3130, CA3130A, No. 817.4., Harris Corporation 1998.

* cited by examiner

*Primary Examiner*—Chi H. Pham
*Assistant Examiner*—Tri H. Phan
(74) *Attorney, Agent, or Firm*—Winston Hsu

(57) ABSTRACT

A transceiver in a full duplex communication system includes a transmitting circuit coupled to a channel for transmitting a transmit signal to the channel, a cancellation signal generator coupled to the channel for generating a cancellation signal according to the transmit signal, and an echo cancellation device coupled to the transmitting circuit and the cancellation signal generator for attenuating an echo corresponding to the transmit signal with the cancellation signal.

13 Claims, 4 Drawing Sheets

TRANSCEIVER FOR FULL DUPLEX COMMUNICATION SYSTEMS

CROSS REFERENCE TO RELATED APPLICATIONS

This is a continuation-in-part of U.S. application Ser. No. 10/904,338, filed Nov. 4, 2004, entitled "ECHO CANCELLATION DEVICE FOR FULL DUPLEX COMMUNICATION SYSTEMS" and which is included herein by reference.

BACKGROUND OF INVENTION

1. Field of the Invention

The present invention relates to a transceiver, and more particularly, to a transceiver in a full duplex communication system.

2. Description of the Prior Art

As technology advances, network applications have become more and more popular. Network bandwidth requirements are also increasing as the transmission speed of data transmission standards such as Ethernet have raised from 10/110 Mps to above 1 Gbps. As is well known in the art, each port of a 1 Gbps gigabit Ethernet device has four channels, wherein each of the four channels has a transceiver.

Please refer to FIG. 1, which depicts a simplified schematic diagram of a conventional transceiver 100 in a channel of a gigabit Ethernet device. In general, the transceiver 100 is coupled to a twisted pair 118 via a line interface 116. As shown in FIG. 1, the transceiver 100 comprises a transmitter section 104 and a receiver section 106. The transmitter section 104 has a digital-to-analog converter (DAC) 108 for converting a transmit signal (a near-end signal) into analog form. The analog transmit signal is then transmitted to a far-end network device via the line interface 116 and the twisted pair 118. The receiver section 106 has an analog-front-end (AFE) circuit for processing a receive signal (a far-end signal) received from the line interface 116, and an analog-to-digital converter (ADC) 114 for converting the processed signals into digital form. The digital signal is then sent to following stages for further processing. The gigabit Ethernet device and the far-end network device both simultaneously utilize four channels where each channel simultaneously performs transmitting and receiving operations. As a result, the gigabit Ethernet device is a full duplex communication system.

As mentioned above, each channel of the gigabit Ethernet device simultaneously performs transmitting and receiving operations. When the channel is transmitting, the signals received from the channel are affected by the transmission, and this phenomenon is known as echo impairment. In order to reduce echo impairment in a communication system, an echo cancellation device 110 and an echo cancellation resistor Rp are usually employed in the conventional transceiver 100. The echo cancellation device 110 is usually a DAC for generating a cancellation signal that corresponds to the transmit signal output from the DAC 108 in order to cancel the effects of the transmit signal on the receiver section 106 and thereby achieve echo cancellation.

However, the unavoidable parasitic capacitance effect in practical implementations is not considered in the echo cancellation device 110 of the prior art. Therefore, the echo effect of the transceiver 100 cannot be effectively reduced to the lowest level using the echo cancellation device 110 and thereby results in echo residue on the receiver section 106.

SUMMARY OF INVENTION

It is therefore one of the objectives of the claimed invention to provide a transceiver in a full duplex communication system to minimize echo impairment by considering the parasitic capacitance effect of the transceiver.

According to a preferred embodiment of the present invention, a transceiver in a full duplex communication system is disclosed. The transceiver includes: a transmitting circuit coupled to a channel for transmitting a transmit signal to the channel; a cancellation signal generator coupled to the channel for generating a cancellation signal according to the transmit signal, wherein the cancellation signal corresponds to the transmit signal; and an echo cancellation circuit coupled to the transmitting circuit and the cancellation signal generator for attenuating an echo corresponding to the transmit signal with the cancellation signal.

One advantage of the present invention is that the parasitic capacitance effect is minimized with the echo cancellation circuit and the performance of echo cancellation is thereby improved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
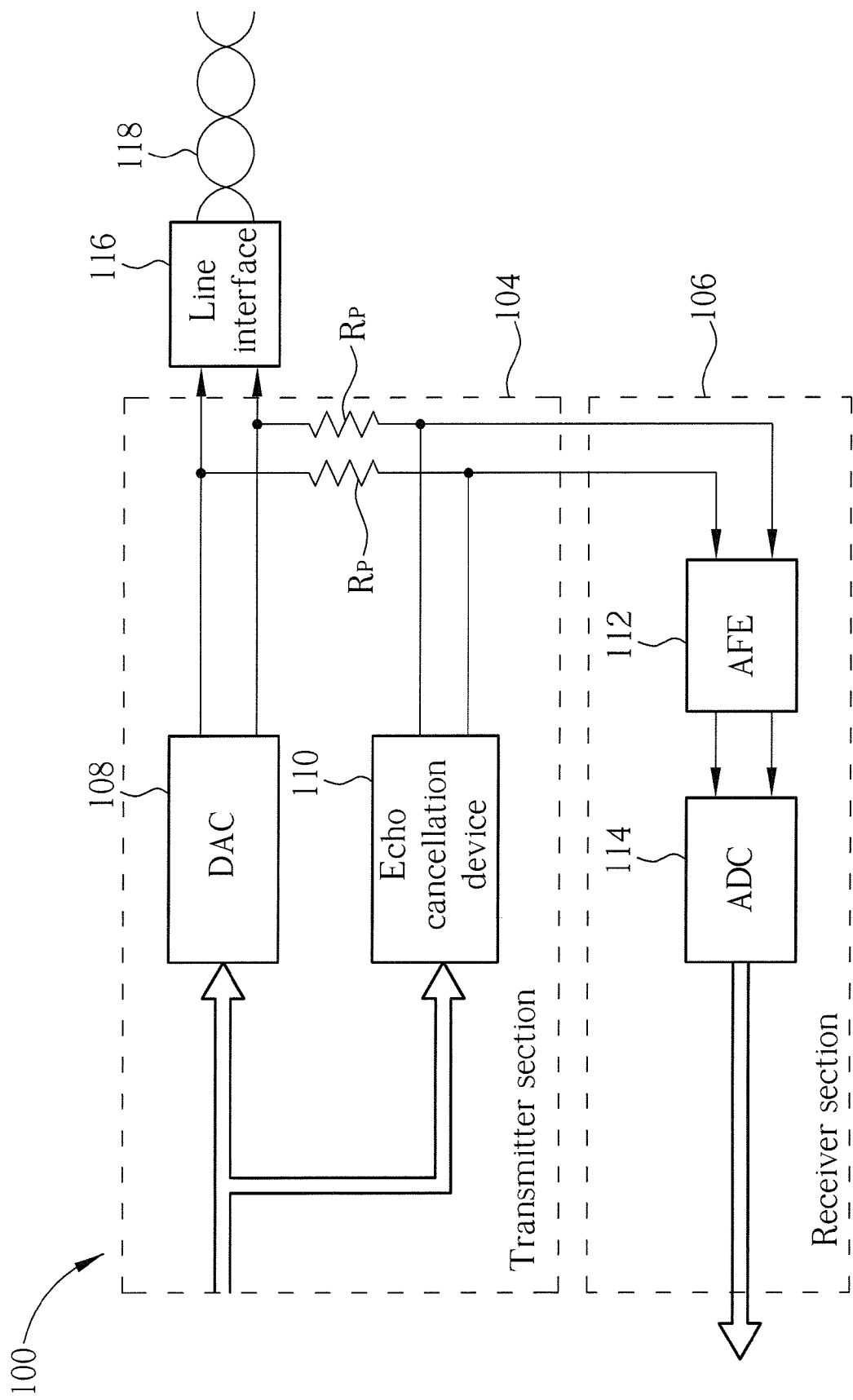
FIG. 1 is a simplified schematic diagram of a conventional transceiver in a channel of a gigabit Ethernet device.
Figure 2:
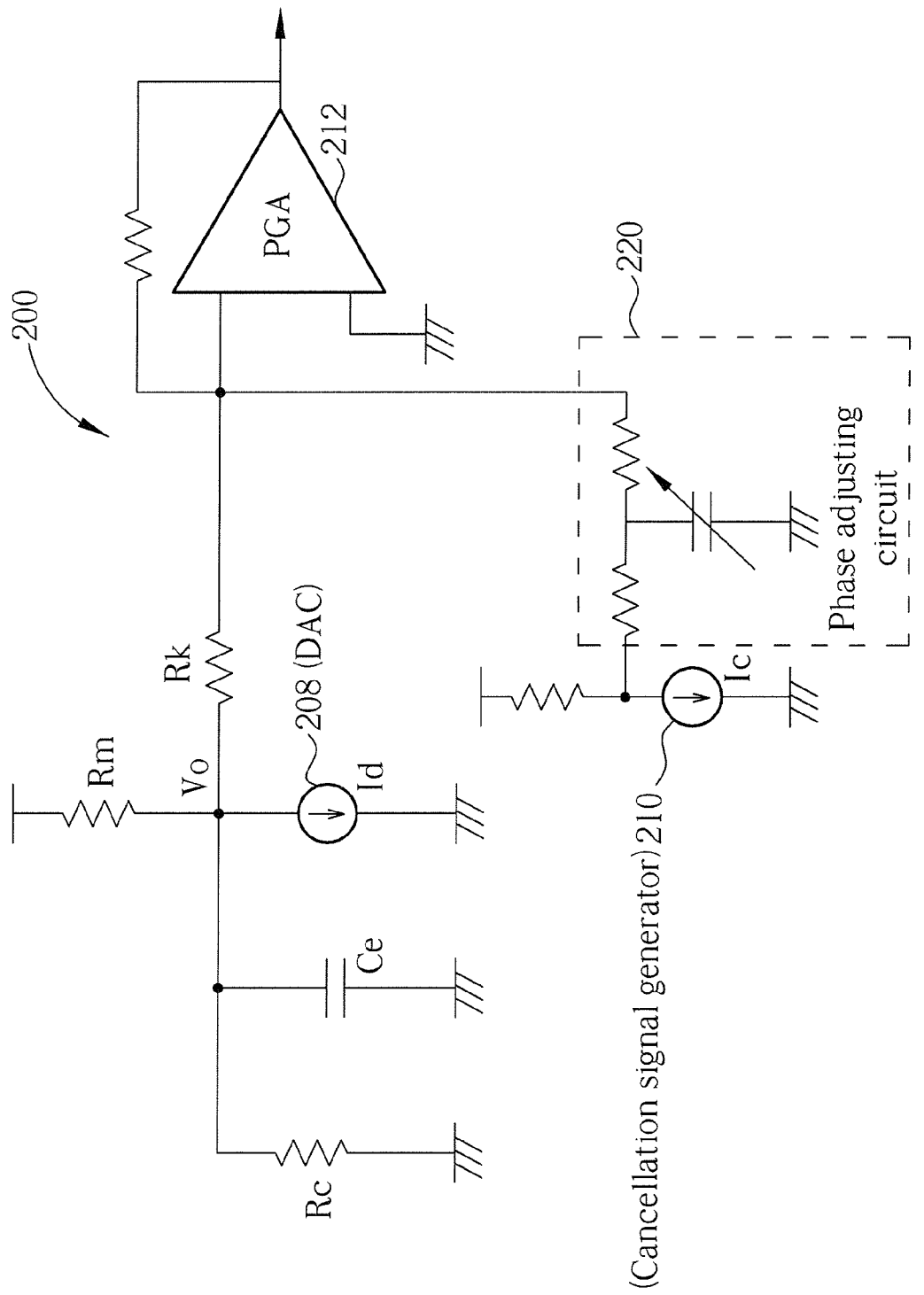
FIG. 2 is a simplified equivalent circuit diagram of a transceiver according to the embodiment of the present invention.

Please refer to FIG. 2, which depicts a simplified equivalent circuit diagram of a transceiver 200 according to the embodiment of the present invention. The transceiver 200 comprises: a digital-to-analog converter (DAC) 208 coupled to a channel for outputting a transmit signal to the channel; a cancellation signal generator 210 for generating a cancellation signal according to the transmit signal; a phase adjusting circuit 220 coupled to the DAC 208 and the cancellation signal generator 210 for adjusting the phase of the cancellation signal; a programmable gain amplifier (PGA) 212 coupled to the phase adjusting circuit 220 and the DAC 208 for attenuating an echo corresponding to the transmit signal in the receive signal; and a resistor Rk coupled between the DAC 208 and the PGA 212.

In FIG. 2, the electrical equivalent of the DAC 208 and the cancellation signal generator 210 are current sources Id and Ic, respectively. The phase adjusting circuit 220 comprises an adjustable capacitor. A capacitor Ce is the parasitic capacitance of the transmitter section of the transceiver 200, a resistor Rc is the equivalent resistor of the channel, and a resistor Rm is a matching resistor. As mentioned above, in order to achieve echo cancellation, the effect caused by the transmit signal on the following stages of the PGA 212 should be balanced by the cancellation signal. The parasitic capacitance effect, however, results in a phase error between the signals output from the current sources Ic and Id so that the echo impairment caused by the current source Id can not be fully cancelled by the current source Ic. Therefore, echo residue occurs in the following stages of the PGA 212. The embodiment of the present invention changes the equivalent capacitance of the phase adjusting circuit 220 to adjust the phase of the signal output from the current source Ic in order to overcome the parasitic capacitance effect.

Figure 3:
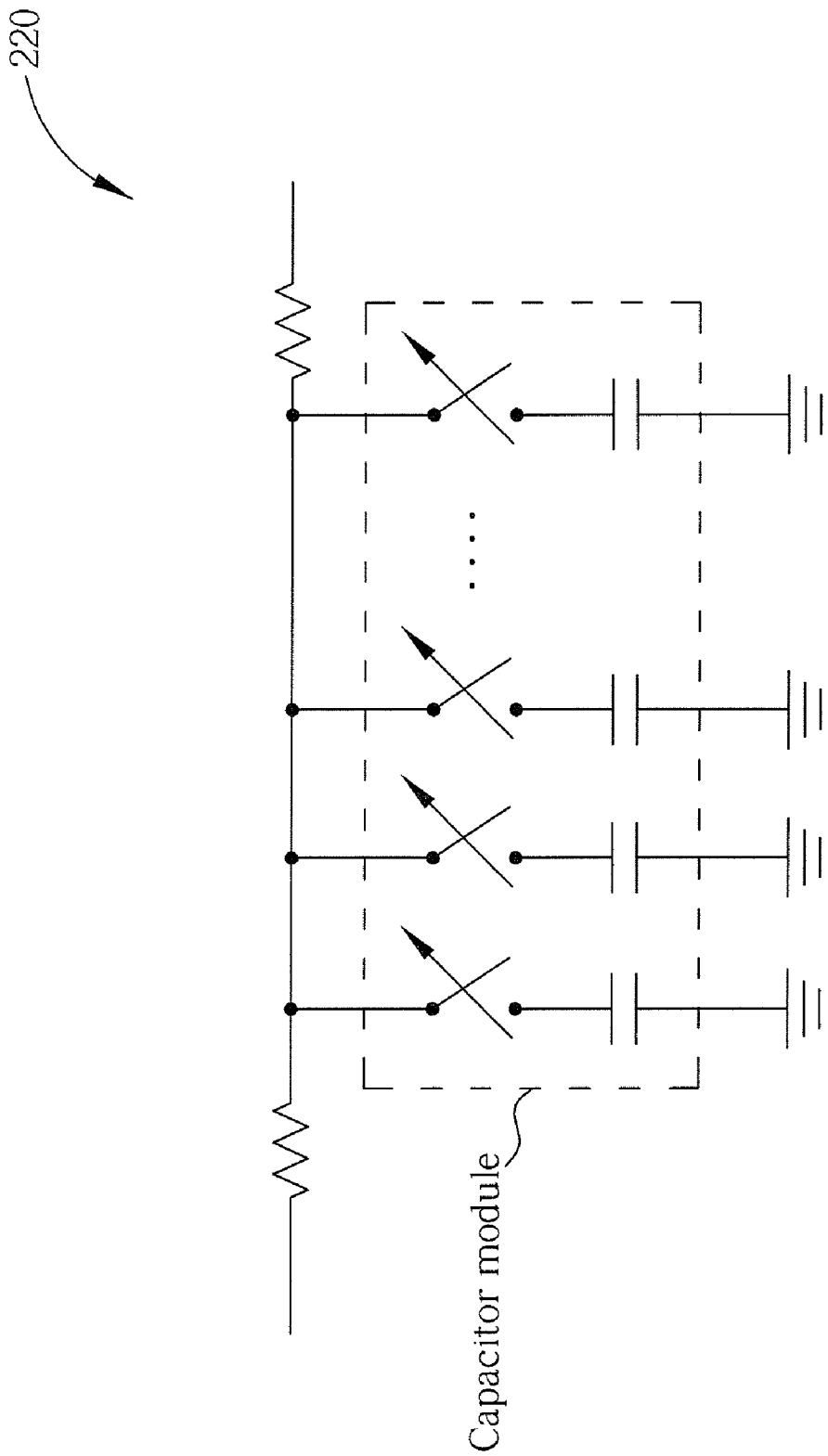
FIG. 3 is an equivalent circuit diagram of the phase adjusting circuit according to a first embodiment of the present invention.

FIG. 3 depicts an equivalent circuit diagram of the phase adjusting circuit 220 according to a preferred embodiment of the present invention. As shown in FIG. 3, the phase adjusting circuit 220 comprises a capacitor module, which includes a plurality of capacitors and switches.

In general, the transceiver 200 of the embodiment of the present invention further configures an analog-to-digital converter (ADC) after the PGA 212 to convert the receive signal into digital form.

Since the capacitance of the parasitic capacitor Ce, the resistance of the channel's equivalent resistor Rc, or the impedance of the matching resistor Rm is possibly affected by the operating environment, temperature, manufacturing deviations, or the like, the values will fluctuate and change when transmitting/receiving data. In order to more precisely eliminate echo, the transceiver 200 of the present invention further utilizes an echo residue detector (not shown) for detecting the echo residue at the stages after the PGA 212. The echo residue detector generates a control signal according to the detected echo residue to control the plurality switches of the capacitor module of the adjusting circuit 220 in order to adjust the capacitance of the capacitor module. In practical implementations, the echo residue detector can be a phase error detector, such as a SNR monitor. In addition, the echo residue detector can also generate the control signal according to the signal-to-noise (SNR) of the signal outputted from the equalizer.

As can be inferred from the above, the echo residue detector adjusts the capacitance of the phase adjusting circuit 220 by utilizing feedback control with the echo residue on the following stages after the PGA 212. Thus, the transceiver 200 of the embodiment of the present invention can obtain an optimal performance of echo cancellation by dynamically adjusting the phase of the cancellation signal according to the different characteristics of circuit components and network environment.

Figure 4:
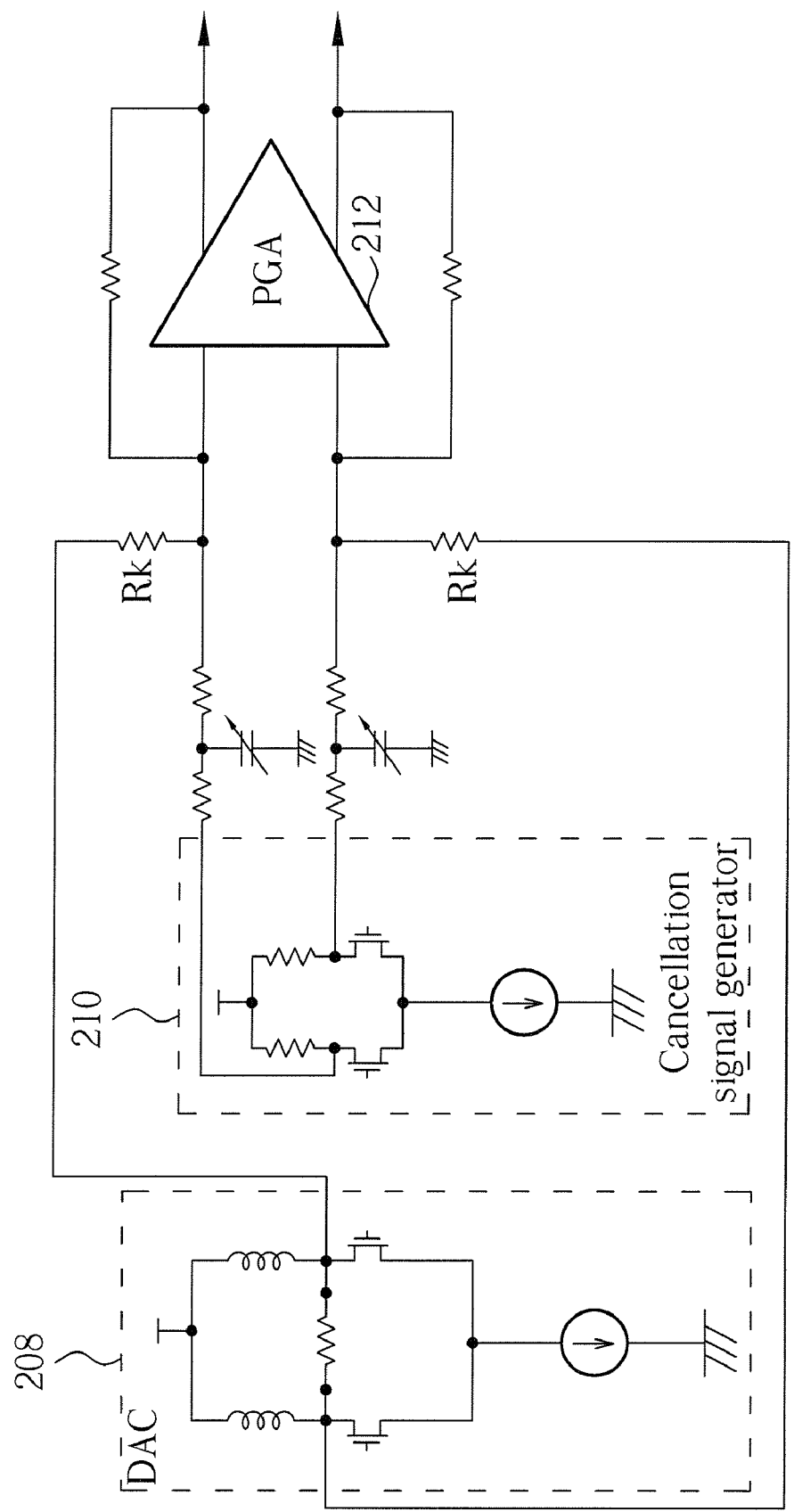
FIG. 4 is a schematic diagram of a differential transceiver according to the embodiment of the present invention.

FIG. 4 illustrates a schematic diagram of a differential transceiver 200 according to the embodiment of the present invention. Preferably, the DAC 208 outputs the transmit signal in differential form. In order to improve echo cancellation performance, the cancellation signal generator 210 of the present invention also outputs the cancellation signal in differential form. The differential cancellation signals output from the cancellation signal generator 210 are coupled to the differential transmit signals respectively and then sent to the two inputs of the PGA 212. The PGA 212 of the embodiment of the present invention is capable of increasing echo cancellation quality with improvement in noise immunity by operating in differential mode.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A transceiver in a full duplex communication system, the transceiver comprising:
a transmitting circuit coupled to a channel for transmitting a transmit signal to the channel;
a cancellation signal generator coupled to the channel for generating a cancellation signal according to the transmit signal, wherein the cancellation signal corresponds to the transmit signal;
a phase adjusting circuit coupled to the transmitting circuit and the cancellation signal generator for adjusting the phase of the cancellation signal, comprising:
a capacitor module including a plurality of capacitors coupled in parallel and a plurality of switches coupled to the corresponding capacitors respectively;
an echo residue detector coupled to the echo cancellation circuit for detecting an echo residue and generating a control signal according to the echo residue to control the switches of the capacitor module; and
an echo cancellation circuit coupled to the transmitting circuit and the cancellation signal generator for attenuating an echo corresponding to the transmit signal with the cancellation signal.

2. The transceiver of claim 1, wherein the echo cancellation circuit comprises a gain amplifier.

3. The transceiver of claim 2, wherein the gain amplifier is a programmable gain amplifier (PGA).

4. The transceiver of claim 1, wherein the transmitting circuit comprises a digital-to-analog converter (DAC) for converting the transmit signal into an analog form.

5. A transceiver in a full duplex communication system, the transceiver comprising:
a transmitting circuit coupled to a channel for transmitting a transmit signal to the channel;
a cancellation signal generator coupled to the channel for generating a cancellation signal according to the transmit signal, wherein the cancellation signal corresponds to the transmit signal, comprising:
a current source for providing a current; a first output node and a second output node for outputting the cancellation signal, wherein the first output node is coupled to a first input terminal of the gain amplifier and the second output node is coupled to a second input terminal of the gain amplifier; a first switch coupled to the first output node and the current source; a second switch coupled to the second output node and the current source; a first resistor coupled to the first output node; a second resistor coupled to the second switch, wherein the cancellation signal is generated through controlling the first and the second switches; and an echo cancellation circuit coupled to the transmitting circuit and the cancellation signal generator for attenuating an echo corresponding to the transmit signal with the cancellation signal.

6. The transceiver of claim 5, further comprising a phase adjusting circuit coupled to the transmitting circuit and the cancellation signal generator for adjusting the phase of the cancellation signal.

7. The transceiver of claim 6, wherein the cancellation signal generator directly coupled to the echo cancellation circuit via the phase adjusting circuit.

8. A transceiver in a full duplex communication system, the transceiver comprising:
a transmitting circuit coupled to a channel for transmitting a transmit signal to the channel, comprising:
a digital-to-analog converter (DAC) for converting the transmit signal into an analog form, comprising:
a current source for providing a current;
a first output node and a second output node for outputting the transmit signal;
a first switch coupled to the first output node and the current source;
a second switch coupled to the second output node and the current source;
a first inductor coupled to the first output node;
a second inductor coupled to the second switch; and
a resistor coupled to the first and the second output node;

a cancellation signal generator coupled to the channel for generating a cancellation signal according to the transmit signal, wherein the cancellation signal corresponds to the transmit signal;

a phase adjusting circuit coupled to the transmitting circuit and the cancellation signal generator for adjusting the phase of the cancellation signal; and an echo cancellation circuit coupled to the transmitting circuit and the phase adjusting circuit for attenuating an echo corresponding to the transmit signal with the cancellation signal.

9. The transceiver of claim 8, further comprising:

an echo residue detector coupled to the echo cancellation circuit for detecting an echo residue and generating a control signal according to the echo residue to control the phase adjusting circuit.

10. The transceiver of claim 9, wherein the phase adjusting circuit further comprises a capacitor module having a plurality of capacitors, and the control signal is employed to adjust the equivalent capacitance of the capacitor module.

11. The transceiver of claim 8, wherein the echo cancellation circuit comprises a gain amplifier.

12. The transceiver of claim 11, wherein the gain amplifier is a programmable gain amplifier (PGA).

13. The transceiver of claim 8, wherein the cancellation signal generator is directly coupled to the echo cancellation circuit via the phase adjusting circuit.

* * * * *